Patented Oct. 27, 1925.

1,558,927

UNITED STATES PATENT OFFICE.

WAYLAND L. SCARFF, OF AUBURN, WASHINGTON.

BATTERY SEPARATOR.

No Drawing.  Application filed December 24, 1923.  Serial No. 682,583.

*To all whom it may concern:*

Be it known that I, WAYLAND L. SCARFF, a citizen of the United States of America, and resident of the city of Auburn, in the county of King and State of Washington, have invented certain new and useful Improvements in Battery Separators, of which the following is a specification.

Heretofore it has generally been considered essential to treat wood slabs which are to be used as separators for storage batteries to free them of certain essential constituents which were believed to deleteriously affect their use as such separators or to treat them so that they will not shrink when dried nor swell when wet, or for both purposes. I have discovered, however, a certain wood which is peculiarly adapted for storage battery separators without treatment of any character, except, of course, I prefer to employ seasoned wood for the purpose.

This wood, commonly known as yellow cedar, or Alaska cedar, has been given the name *Chamaecyparis nootkatensis*. While it contains resin, oils, and acids, such as acetic acid, nevertheless it appears to be formed of a closely knit cellular structure in which the individual cells remain sealed. These sealed cells do not themselves absorb water nor exude their contents, although apparently water is permitted to pass freely between the cells. They do not give up the acetic acid content nor the resins or oils to any appreciable degree, these remaining sealed within the cells. In fact, the slightly pungent aroma which is characteristic of this wood is not noticeable except upon cutting into the wood, the cutting breaking down a few certain cells and liberating the aromatic oils from these cells only.

I have discovered that yellow cedar has certain important characteristics which distinguish it from other woods and peculiarly adapt it for use as battery separators. These are, first, its toughness or firmness; second, its fibrous structure; third, its uniform porosity; and fourth, its capacity for use in a battery without special treatment.

Because of its toughness and firmness, and also because of its peculiar fibrous structure, it is extremely pliable, especially when wet, as it would be in a battery. It holds together, even under conditions of alternating wetness and dryness, and yet no cracks or crevices form. Such cracks will often form in ordinary wood separators, where they act as pockets to receive battery sediment, and eventually short-circuit the battery.

The separators of yellow cedar are difficult to wear through, as often happens when the plates buckle through age or overcharging. At all times there is slight movement between the plates and the interposed separators. This manifests itself in a tendency to wear through the separators, especially at the three unsecured corners of the plates, and this tendency is greatly aggravated when the plates begin to buckle or are heated, for the pressure thus caused localizes and increases the pressure between plates and separators. Frequently such conditions cause the separators to wear through at the corners, thus short-circuiting the cell. I have found yellow cedar separators, because of their toughness, to be highly resistant to such wear.

The fibrous structure of yellow cedar, apparently interlocking, is of especial advantage in thin separators, for it imparts elasticity to them. It permits them to give in all directions under stresses to which they are subjected in a battery, such as the action of a buckled plate mentioned above, as it tends to expand or contract. The same fibrous character of the wood appears to be the reason for its porosity.

The wood is quite uniform in structure throughout, and this renders it uniformly porous. There are no patches about the area of a separator which are less porous than other adjacent areas, and in consequence, the flow of current is least impeded in passing through such yellow cedar separators. This gives to a battery employing such separators a high discharge rate when required, as in starting a motor, but gives it also a high charging rate, both highly desirable attributes. The internal resistance of the battery is lessened by the uniform porosity of yellow cedar separators, and also by their characteristic refusal to collect current-impeding battery sediment.

Separators control the life of a battery to a large extent, as is well-known, hence the more perfect the separator the more efficient and the longer-lived will the battery be. Proper separators will prolong not only their own life but the life of the plates. Uniform porosity of the separators plays a large part in their value, for uneven porosity of the separators necessitates greater use of some parts of the plates than others, and more quickly wears them away and heats them. No wood now known has more uniform porosity than yellow cedar.

One of the highly important characteristics of yellow cedar is its capacity for use without preliminary treatment. Ordinarily separators require treatment for days to remove resins, oils and acids, for these agents are present in all woods employed for the purpose, and when freed are all deleterious to the component parts of the battery. For example, acetic acid, freed from wood separators, attacks the lead plates and terminals. While I do not contend that acetic acid, resins, and the like are lacking in yellow cedar, nevertheless these deleterious substances appear to be so sealed in the wood that they are not released, hence have no effect on the battery. This appears to be due to a cellular structure peculiar to this wood, by reason of which the cells containing these substances remain unbroken, though the spaces between the cells permit passage of the electrolyte.

This view seems to be substantiated by the fact that little odor is noticeable from seasoned wood, but immediately the wood is cut into, dividing certain of the cells, the distinctive odor of yellow cedar is quite noticeable. Whatever the reason, however, I have discovered that treatment of yellow cedar separators is unnecessary, although not apparently harmful, but that untreated yellow cedar separators will act in all respects as the best treated separators of other woods, and without in any way harming the battery parts.

This discovery makes it possible to greatly increase the rapidity with which separators can be manufactured, it reduces the investment required and in this and other ways reduces the cost of separators.

These qualities of extreme toughness and firmness; the peculiar fibrous structure; its uniform porosity, and its capacity for use without special treatment, all distinguish yellow cedar from related woods, such as Lawson cypress (*Chamaecyparis lawsoniana*). In large measure these desirable qualities appear to be the result of the exceedingly fine grain of the wood. Yellow cedar is a mountain wood, and is chiefly found in northern latitudes. It is therefore more exposed to rigorous weather and more extreme climatic conditions, and to greater changes in temperature, than Lawson cypress, which is related thereto, but which grows in more southerly latitudes, generally nearer the influence of the ocean, and at lower levels. The qualities noted above distinguish yellow cedar from Lawson cypress; in particular it should be noted that Lawson cypress must always be treated prior to use, or the acids and resins contained therein attack and soon destroy the battery.

The wood is a native of the North Pacific slope, being found as far south as Mt. Rainier, in Washington, in the Olympic Mountains, in the Cascades, and north through British Columbia, including both the mainland and islands, in southeastern Alaska, and in the Aleutian Islands. The most suitable wood is grown in British Columbia at elevations of twelve hundred to eighteen hundred feet, although in favorable localities merchantable wood is found up to six thousand feet, and at higher latitudes suitable timber is grown near sea level.

The seasoned wood from these trees does not shrink when dried nor swell when immersed in the electrolyte of the battery, or other solution. It does not warp or twist to any great extent. It does not decay nor break down under long exposure to moisture. It is uniformly porous to the electrolyte, yet its texture is so firm that the battery sediment does not enter it. Consequently it does not become clogged with such sediment and does not sulphate, but yet permits free passage of the electric current throughout its area.

From the foregoing it is evident that the separators of this invention are ideal for use in storage batteries and require no treatment. They can, therefore, be made easily and cheaply. They will outlast separators of other known woods and will keep the battery in the best possible condition without clogging and at full strength.

What I claim as my invention is:

1. A storage battery separator consisting of wood of the species *Chamaecyparis nootkatensis*.

2. A storage battery separator consisting of dry wood of the species *Chamaecyparis nootkatensis*.

Signed at Auburn, King County, Washington, this 15th day of December, 1923.

WAYLAND L. SCARFF.